United States Patent [19]
Horn et al.

[11] 3,926,759
[45] Dec. 16, 1975

[54] PROCESS FOR RECOVERING TIN SALTS FROM THE WASTE RINSE WATER OF A HALOGEN TIN PLATING PROCESS

[75] Inventors: Richard E. Horn, Pittsburgh; David W. Grenda, Houston, both of Pa.

[73] Assignee: Pitt Metals and Chemicals, Inc., Pittsburgh, Pa.

[22] Filed: Feb. 6, 1975

[21] Appl. No.: 547,728

[52] U.S. Cl. .............................. 204/180 P; 204/151
[51] Int. Cl.² ...................... C23G 1/32; B01D 13/02
[58] Field of Search ........ 204/120, 121, 122, 180 P, 204/301, 151

[56] References Cited
UNITED STATES PATENTS

| | | | |
|---|---|---|---|
| 3,124,520 | 3/1964 | Juda................................ | 204/120 X |
| 3,347,761 | 10/1967 | Bicek.............................. | 204/120 X |
| 3,481,851 | 12/1969 | Lancy............................. | 204/180 P |
| 3,787,293 | 1/1974 | Kametani....................... | 204/122 X |
| 3,787,304 | 1/1974 | Chlanda et al. ................. | 204/180 P |
| 3,788,959 | 1/1974 | Smith.............................. | 204/180 P |

*Primary Examiner*—John H. Mack
*Assistant Examiner*—A. C. Prescott
*Attorney, Agent, or Firm*—Stanley J. Price, Jr.

[57] ABSTRACT

The waste rinse water from a halogen tin plating process contains both tin and fluoride with the mole ratio of fluoride to tin being between 21 and 25 to 1. The plating bath also contains tin and fluoride as a tin fluoride complex in a mole ratio of fluoride to tin of between 6 and 7 to 1. The waste rinse water is first filtered to remove insoluble materials such as iron ferrocyanides. The filtrate is then treated to remove residual organic compounds. The treated solution is then rectified in an electrodialytic cell where the solution is introduced into a depletion compartment which is separated from the anode compartment by one or more anionic membranes with compartments therebetween and by a cationic membrane from the cathode compartment. The anode compartment and the compartments between the anode compartment and the depletion compartment contain an acid solution preferably hydrofluoric acid. The cathode compartment contains a caustic solution preferably a sodium hydroxide solution. An insoluble inert anode is positioned in the anode compartment and the current is impressed across the electrodialytic cell. The halogen ions migrate through the anionic membranes from the depletion compartment to the intermediate or receiving compartment and increase the concentration of the halogen acid therein. The sodium ions migrate through the cationic membrane to increase the concentration of sodium hydroxide therein. The rectified rinse water depleted of excess halogens is withdrawn from the depletion compartment and concentrated by a suitable process, such as reverse osmosis, to provide a solution having the desired concentration as a solution for use in the plating bath. The caustic from the cathode compartment and the acid from the intermediate compartment are withdrawn therefrom and reacted to form sodium bifluoride for reuse in the rinse water of the plating process.

17 Claims, 3 Drawing Figures

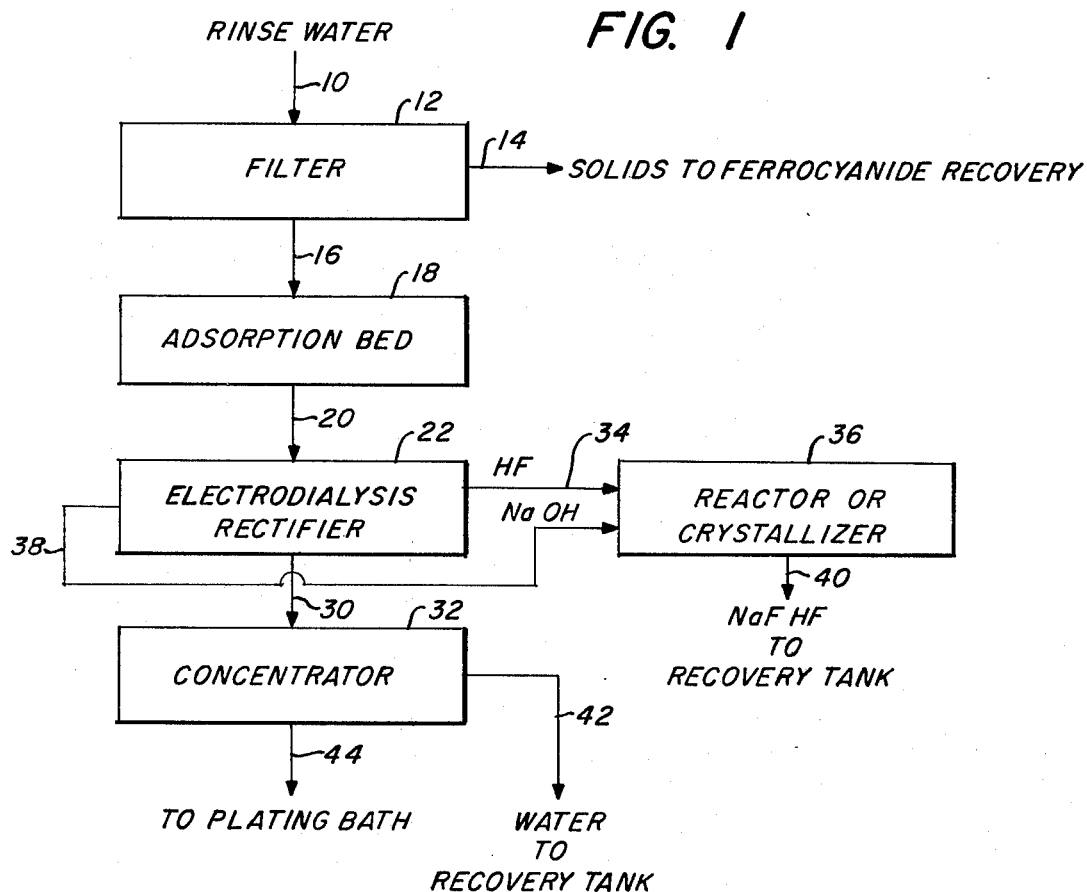

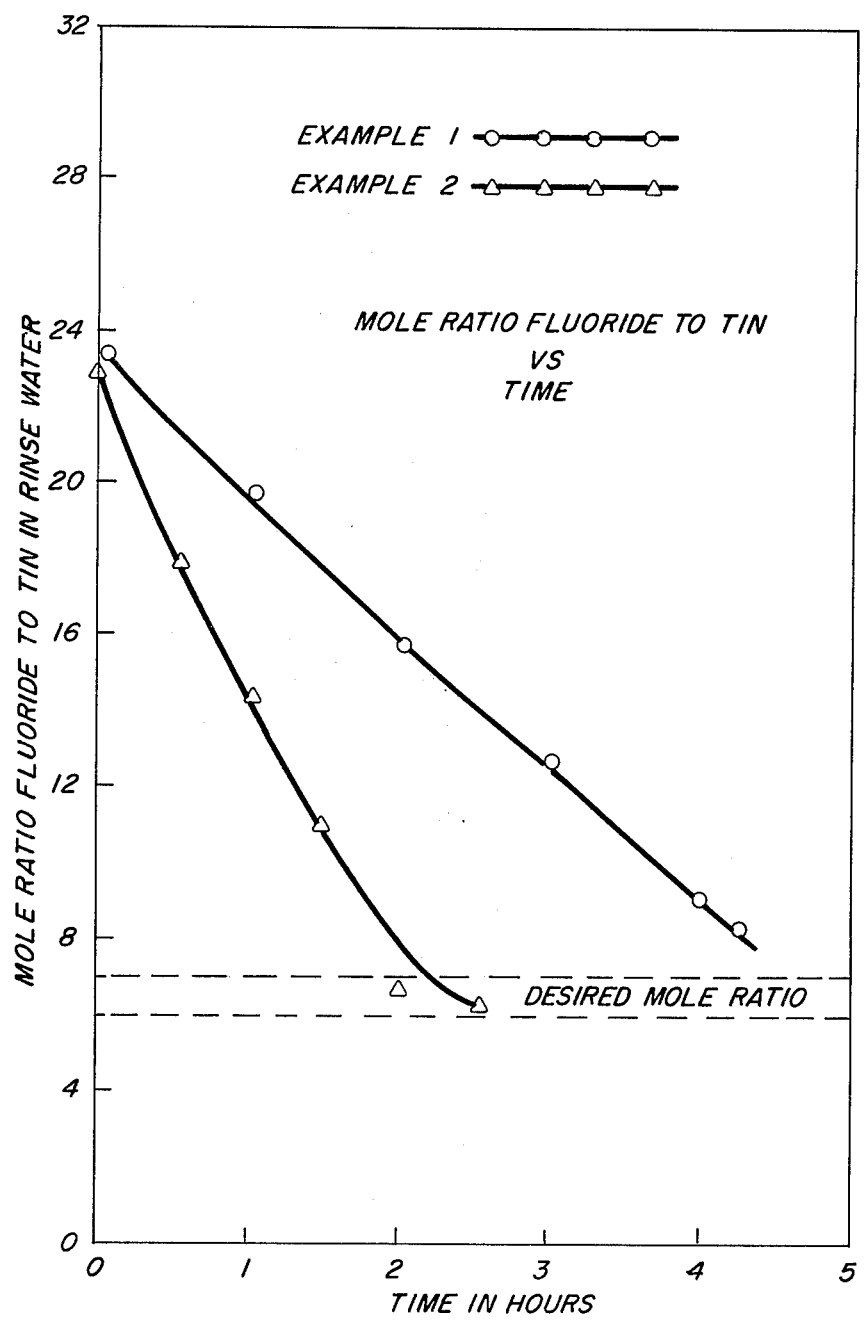

PROCESS FOR RECOVERING TIN SALTS FROM THE WASTE RINSE WATER OF A HALOGEN TIN PLATING PROCESS

BACKGROUND OF THE INVENTION

1. Field of the Invention

This invention relates to a process for decreasing the mole ratio of halogen to tin in an aqueous solution containing the same and more particularly to a process for recovering a concentrated solution of a tin fluoride complex suitable for use in a tin plating bath from the waste rinse water of the halogen tin plating process.

2. Description of the Prior Art

In the continuous tin plating of strip steel a typical electro-tinning bath has the following composition:

| | |
|---|---|
| Stannous Tin | 4.5 oz/gal. |
| Fluoride | 4.75 oz/gal. |
| Sodium Chloride | 4.60 oz/gal. |
| Sodium Ferrocyanide | 0.15 oz/gal. |
| Organic Brighteners | 30 ml/gal. |
| pH | 3.3 |
| Mole Ratio | F:Sn = 6–7:1 |

The bath is prepared commercially from stannous chloride, sodium bifluoride and sodium fluoride. A reaction occurs between the stannous chloride and the sodium bifluoride to form a tin fluoride complex with a fluostannite ion. The reaction is set forth below in equations (1) and (2).

or

The fluostannite ion so formed has been referred to by the formulas $SnF_4^{-2}$ and $SnF_6^{-4}$. The literature confirms that the success of the above enumerated electro-tinning bath is due to the formation of the fluoride complex.

The following patents describe the tin plating process.

U.S. Pat. Nos. 2,402,185; 2,407,579; 2,457,152; 2,461,507; 2,512,719; 2,585,902; 2,736,692; 2,758,075.

The fluoride complex is stable and does not precipitate the basic tin salts when the pH of the bath is within the range of 2.5 and 4.0. Further, it is desirable to maintain the fluoride to tin mole ratio in the bath at between about 6 and 7 to 1.

In the high speed electro-tinning of steel by the halogen tin plating process the sheet steel enters the plating cells from the pickling section and is plated on one side. The sheet steel is then conveyed to a second tier and reversed where it is plated on the other side. Thereafter, it is conveyed to a third tier where it reverses itself for the first rinse. The rinse section is commonly referred to as "the recovery section."

The sheet steel is commonly plated at speeds between 1100 and 1800 feet per minute. At these speeds the surface tension of the plating solution causes some of the solution to be dragged out of the plating cells into the recovery tank in the recovery section. This results in a loss of chemicals from the plating section. In addition, because the recovery tank contains a large volume of water, the tin in the plating solution is subject to precipitation by hydrolysis due to the extreme dilution. The precipitation is prevented by the addition of sodium bifluoride to the rinse water to maintain the complexing action of the fluoride and keep the tin as a stable complex anion. This maintains the sheet steel bright and clean and free of precipitates. The extremely dilute solution is permitted to overflow and is lost to the sewer system. This poses a definite problem with regard to pollution because of the chemicals contained in the rinse water.

Further, even though the concentration of tin in the rinse water is very low, the large volume of the rinse water results in a loss of appreciable quantities of tin and results in a high chemical replacement cost both for replacing the lost tin and the lost fluorides. The typical rinse water removed from the rinse tank contains between 0.5 and 1.5 grams per liter of tin and between 2.0 and 4.0 grams per liter of fluoride. The mole ratio of the fluoride to the tin usually runs between 21 and 25 to 1.

U.S. Pat. No. 3,284,350 suggests treating the rinse water by precipitating the tin and the fluorides using lime. The precipitation of the tin and fluoride eliminates the pollution problem. It, however, results in the loss of the fluoride units and where the tin is sent to a smelter for recovery results in additional costs to recover the tin.

It has also been proposed to concentrate the waste rinse water by evaporation. This is uneconomical because of the extremely large amounts of water that must be removed. During the evaporation, because of common ion effects, crystallization occurs at an early stage of evaporation. A complicated and expensive process is required to separate the crystallized compounds.

Concentration by other means as, for example, reverse osmosis or electrodialysis as suggested in U.S. Pat. No. 3,674,669 poses several problems. First, the mole ratio of fluoride to tin in the waste water is completely different from the mole ratio of fluoride to tin in the plating bath so that even if the solution could be recovered by reverse osmosis or electrodialysis the recovered solution would not be suitable for use as a plating solution. By introducing a solution containing the high mole ratio of fluoride to tin the plating solution would soon become completely unbalanced because of the excess fluorides. Further, the excess fluorides in the form of sodium bifluoride cause crystallization because of common ion effects long before the desired solution concentration is achieved and the crystals foul the membrane. This crystallization problem makes the reverse osmosis process unworkable.

There is a need for a process to recover the tin and fluoride units in solution form and to recover the tin and fluoride units in the approximate concentrations and ratios in which they were originally present in the plating bath.

There is also a need to recover the excess fluorides as bifluorides for reuse in the recovery section and to recover the water for reuse in the same manner.

SUMMARY OF THE INVENTION

This invention relates to a process for recovering the tin and fluoride units from waste rinse water in an approximate concentration and ratio suitable for use in a halogen plating bath and includes first filtering the waste rinse water to remove insoluble materials and thereafter treating the filtered rinse water to remove residual organic compounds. The so treated rinse water is thereafter introduced into a depletion compartment of an electrodialytic cell where the excess fluorides are removed therefrom by migrating through an anionic membrane into an adjacent compartment. When a sufficient amount of the fluoride units have been removed from the rinse water by electrodialysis so that the mole ratio of fluoride to tin is suitable for use in a plating bath the rectified rinse water is removed from the electrodialytic cell and is concentrated by electrodialysis or reverse osmosis to form a solution having the approximate concentration of the plating bath. The fluorides are removed from the compartment adjacent the depletion compartment and are reacted with sodium hydroxide to form a bifluoride for use in the rinse water. With this arrangement the tin and fluoride salts are recovered from the rinse water and utilized in the tin plating bath and the fluoride units are also used as a bifluoride in the rinse water. The depleted water may be discarded or returned to the rinse water tank.

The invention further relates to a process for decreasing the mole ratio of a halogen to tin in a aqueous solution that contains the same by introducing the aqueous solution into a depletion compartment of an electrodialytic cell and removing the excess halogen ions by migration through an anionic membrane.

Accordingly, the principal object of this invention is to recover the tin and fluoride units from waste rinse water.

Another object of this invention is to recover a solution from the waste rinse water that contains tin and fluoride units in a suitable ratio for use in the tin plating bath.

These and other objects and advantages of this invention will be more completely disclosed and described in the following specification, the accompanying drawings and the appended claims.

BRIEF DESCRIPTION OF THE DRAWINGS

FIG. 1 is a schematic flow diagram of the process for recovering the tin and fluoride units from waste rinse water of a halogen tin plating process.

FIG. 2 is a diagrammatic representation of the electrodialysis unit illustrated in FIG. 1.

FIG. 3 is a graphic representation of the decrease in mole ratio of fluoride to tin in the rinse water when it is subjected to electrodialysis.

DESCRIPTION OF THE PREFERRED EMBODIMENTS

Referring to the drawings and particularly to FIG. 1 the waste rinse water from the recovery section combined with any leakage or drippings from the pumps, cells, valves and the like is conveyed from the recovery section through conduit 10 to a conventional filter 12. The insoluble materials, particularly iron ferrocyanides, which have been generated by the precipitation of dragged in iron by sodium ferrocyanide are filtered by the filter 12. The solids are removed by a suitable conveying device 14 and are conveyed to a suitable device for recovering the ferrocyanide. The filtrate solution is then conveyed through conduit 16 to a tank or column 18 containing a bed of activated carbon. The solution passes through the bed of activated carbon where residual organic compounds are removed therefrom. The treated solution is then conveyed through conduit 20 to an electrodialysis rectifier 22 illustrated in detail in FIG. 2. The rinse water flowing through conduit 20 is introduced into the depletion or rectifying compartment and water is introduced through conduit 24 and branch conduits 26 and 28 into the cathode compartment and the intermediate or receiving compartment of the electrodialytic cell 22. In the cell, as later explained, in reference to FIG. 2, the rinse water introduced into the depletion or rectification compartment where the ratio of fluoride to tin units in the rinse water is reduced from its original mole ratio of fluoride to tin of between 20 and 25 to 1 to a fluoride to tin mole ratio of between 6 and 7 to 1. The rectified rinse water is withdrawn from the electrodialytic cell 22 through conduit 30 and is introduced into a suitable concentrator 32 which may be a reverse osmosis cell or an electrodialytic cell. The fluoride units in the form of HF are removed from the electrodialytic cell 22 through conduit 34 and conveyed to a tank 36. Sodium hydroxide is also withdrawn from the cell 22 through conduit 38 and introduced into tank 36 where it is reacted with the HF to form the sodium bifluoride. The sodium bifluoride is withdrawn from tank 36 through conduit 40 and may be used as an additive to the rinse water to prevent the hydrolysis of the plating solution in the rinse tank or may be crystallized. Where desired, a plurality of intermediate compartments in series with suitable recycle may be used in the electrodialytic cell 22 to form a tin free fluoride solution.

Water is removed from the concentrator through conduit 42 and may be recycled to the rinse tank or discarded. The concentrated solution of the rectified rinse water now contains sodium and fluoride units in the desired mole ratio for use in the plating bath and is conveyed through conduit 44 from the concentrator 32 to the plating tanks.

Referring now to FIG. 2, the electrodialytic cell 22 is of the salt splitting type and includes an anode compartment 46 that has a suitable anode 48, such as a platinum anode. The anode compartment is separated from the adjacent compartment 50 by a cationic membrane 52 and the anode compartment contains an acid solution as, for example, a sulphuric acid solution. The adjacent compartment 50 which may be designated an intermediate or receiving compartment is separated from the adjacent rectifying compartment 54 by an anionic membrane 56. The compartment 50 contains a hydrofluoric acid solution and receives a preselected amount of make-up water through conduit 28 during the rectification of the rinse water. The depletion or rectification compartment 54 is separated from the cathode compartment 58 by a cationic membrane 60. Rinse water containing excess fluoride units is introduced through conduit 20 into the compartment 54. During electrodialysis the excess fluoride units in the rinse water migrate through the anionic membrane 56 to decrease the fluoride to tin mole ratio in the rinse water in compartment 54. The cathode compartment 58 contains a suitable cathode 62 and a sodium hydroxide solution. Make-up water is introduced into the cathode compartment 58 through conduit 26. During electrodialysis the sodium ions migrate from the depletion compartment 54 through the cationic membrane 60 into the cathode compartment 58. Electrodialysis takes place in cell 22 when a current is impressed thereacross. The rectified rinse water is removed from the electrodialytic cell 22 through conduit 30 as above described and the hydrofluoric acid through conduit 34 and sodium hydroxide through conduit 38.

It has been discovered that when current is passed through the electrodialytic cell 22 the dissolved ionic solids in the compartment 54 are split. Also, there is a rectification of the anions since it was discovered that the fluoride ions pass through the anion membrane 56 faster than the fluostannite ions or the chloride ions. In this manner the multi compartment anion side of the cell 22, i.e., compartments 46 and 50, act as a rectifier. The compartments are so arranged that the solution is passed through compartment 54 in such a manner that an appreciable amount of the fluostannite ions do not pass through the anion membrane. Fluostannite ions should not be allowed to reach the anode since the oxygen released at the anode would oxodize the fluostannite to a fluostannate compound which is undesirable.

No special type of anion membrane is required such as that mentioned in U.S. Pat. Nos. 3,510,417 and 3,510,418. Special arrangements utilizing gravity as disclosed in U.S. Pat. Nos. 2,854,393 or 3,025,227 are also not required. Nor are capillary passages or special flow conditions required as disclosed in U.S. Pat No. 2,566,308. For example, several different anionic membranes, such as "MA–3475" manufactured by the Ionac Chemical Company, "111BZL–183" manufactured by Ionics Incorporated and "Neosepta AV–4T" manufactured by the Tokuyama Soda Company, Limited, have all been successfully used. It is believed that one of the unique features of the process is that the fluoride and chloride ions transfer considerably faster through the anionic membrane than the fluostannite ions and can thus be separated therefrom.

When the rinse water has been rectified to the extent that the fluoride to tin mole ratio is between 6 and 7 to 1 the rinse water may be concentrated in the concentrator 32 by either a reverse osmosis process or an electrodialysis process. The split salts in the anode and cathode compartments of the electrodialysis unit 22 may then be recombined in appropriate proportions in reactor 36 to react and provide sodium bifluoride for reuse in the recovery section of the plating process. The sodium bifluoride may also be recombined by suitable circulation of the intermediate and cathode streams within the electrodialysis unit 22. The sodium bifluoride may either be crystallized or used in solution form depending upon the amount of water used when they are recombined. The solution or crystals of the sodium bifluoride may then be returned to the plating process.

The following examples are illustrative of the process.

EXAMPLE 1

A four compartment electrodialytic cell similar to that illustrated in FIG. 2 included an anode compartment that contained a platinum anode and 725 ml of sulphuric acid which contained 24.5 gm/l $H_2SO_4$. The anode compartment was bounded by a cationic membrane manufactured by the Ionac Chemical Company and designated "MC–3470." The adjacent compartment similar to intermediate or receiving compartment 50 had 275 ml of hydrofluoric acid of a concentration of 16.5 gm/l HF therein. This receiving compartment was separated from the adjacent rectification or depletion compartment similar to compartment 54 by an anionic membrane manufactured by the Tokuyama Soda Company, Limited and designated "Neosepta AV–4T." The rectification compartment contained 800 ml of rinse water containing 0.82 gm/l Sn and 3.1 gm/l F. The mole ratio of fluoride to tin was 23.5:1. The rectification compartment 54 was bounded from the adjacent cathode compartment by another cationic membrane similar to the cationic membrane separating the anode compartment from the receiving compartment. The cathode compartment contained a nickel cathode and 725 ml of a sodium hydroxide solution containing 11.0 gm/l NaOH. The cell was operated at 29 asf. on the electrodes and 16 asf. on the membranes. The results of the electrodialysis are set forth in Table 1.

TABLE 1

| Time Minutes | Sn g/l | F g/l | Cl g/l | NaOH Cathode Compartment | Mole Ratio F:Sn | Mole Ratio F:Cl | Mole Ratio Cl:Sn |
| --- | --- | --- | --- | --- | --- | --- | --- |
| 0 | 0.82 | 3.10 | 1.90 | 11.00 | 23.5 | 2.62 | 7.86 |
| 60 | 0.81 | 2.55 | 1.80 | 11.03 | 19.7 | 2.63 | 7.50 |
| 120 | 0.80 | 2.00 | 1.20 | 11.30 | 15.7 | 3.08 | 5.07 |
| 180 | 0.78 | 1.55 | 0.88 | 12.00 | 12.4 | 3.28 | 3.79 |
| 240 | 0.76 | 1.10 | 0.60 | 12.60 | 9.1 | 3.41 | 2.66 |
| 255 | 0.75 | 0.98 | 0.55 | 12.93 | 8.3 | 3.55 | 2.54 |

It will be observed from the above table that the fluoride: tin mole ratio decreased in a period of 255 minutes thus providing a solution with the appropriate fluoride to tin mole ratio for use in the plating process.

EXAMPLE 2

A four compartment cell similar to the electrodialytic cell used in Example 1 was employed. The anode compartment had a platinum anode through which was circulated 1 liter of hydrofluoric acid solution containing 5.60 gm/l HF and was bounded by an anionic membrane manufactured by the Ionac Chemical Company and designated "MA–3475." The adjacent receiving compartment contained hydrofluoric acid which was circulated through the compartment. One liter of the acid was employed that contained 2.1 gm/l HF. The next compartment which was the rectification or depletion compartment was separated from the receiving compartment by a similar anionic membrane. A liter of rinse water was circulated through the rectification or depletion compartment and contained 0.50 gm/l Sn and 1.79 gm/l F which had a mole ratio of F:Sn of 22 to 1. The rectification compartment was separated from the cathode compartment by a cationic membrane similar to the membrane used in the first example. The cathode compartment contained a stainless steel cathode and one liter of sodium hydroxide solution containing 23.59 gm/l NaOH. The cell was operated at 10 asf. and the results are set forth in Table 2.

TABLE 2

| Time Minutes | Rectifying Compartment | | | Intermediate Compartment | | Anode Compartment | | Cathode Compartment | Volts |
|---|---|---|---|---|---|---|---|---|---|
| | Sn g/l | F g/l | Mole Ratio F:Sn | Sn g/l | F g/l | Sn g/l | F g/l | NaOH g/l | |
| 0 | 0.50 | 1.79 | 22.43 | 0.0 | 2.10 | 0.0 | 5.60 | 23.59 | 10.6 |
| 30 | 0.50 | 1.44 | 18.04 | 0.0 | 2.0 | 0.0 | 5.95 | 24.30 | 11.2 |
| 60 | 0.47 | 1.09 | 14.40 | 0.03 | 1.92 | 0.0 | 6.29 | 24.76 | 12.0 |
| 90 | 0.40 | 0.72 | 11.00 | 0.10 | 1.83 | 0.0 | 6.72 | 25.72 | 13.2 |
| 120 | 0.35 | 0.38 | 6.76 | 0.12 | 1.80 | 0.0 | 7.10 | 25.50 | 14.0 |
| 150 | 0.275 | 0.28 | 6.31 | 0.23 | 1.80 | 0.005 | 7.10 | 25.50 | 14.3 |

It will be noted again in Table 2 that the mole ratio of fluoride to tin in the rectifying compartment decreased from 22.43 to 6.31.

FIG. 3 is a graphical illustration of the decrease in the mole ratio of fluoride to tin in the rinse water as set forth in the examples. In Example 2 HF was the acid utilized in the anode compartment and the desired mole ratio of fluoride to tin was obtained after 2½ hours. In Example 1 where sulphuric acid was employed in the anode compartment the desired mole ratio was obtained after about 4 hours. With the described process it is now possible to recover the waste water, rectify the fluoride to tin mole ratio and obtain a solution that can be further concentrated for use as an additive to the plating bath.

It should be understood that electrolyte solutions other than those described and illustrated in the examples may be utilized in the anode, cathode and intermediate compartments. Also, electrolyte solutions other than those previously enumerated may be introduced into the cathode and intermediate compartments and other compounds formed in the respective compartments during the electrodialysis process and it is not intended to limit the invention to the specific electrolytes enumerated.

According to the provisions of the patent statutes, the principle, preferred construction and mode of operation of the invention have been explained and what is now considered to represent its best embodiment has been illustrated and described. However, we desire to have it understood that, within the scope of the appended claims, the invention may be practiced otherwise than is illustrated and described.

We claim:
1. A process for recovering tin salts from the waste rinse water of a halogen tin plating process comprising,
   introducing the rinse water into a depletion compartment of an electrodialytic cell,
   introducing an electrolyte solution into an anode compartment and a cathode compartment of said electrodialytic cell, said cathode compartment separated from said depletion compartment by a cationic membrane, said depletion compartment separated from the anode compartment by an anionic membrane,
   passing a current through said electrodialytic cell and reducing the mole ratio of fluoride to tin in the rinse water in said depletion compartment, and
   thereafter removing a substantial portion of the water from the rinse water solution and forming a concentrated solution having the reduced mole ratio of fluoride to tin.

2. A process for recovering tin salts from the waste rinse water of a halogen tin plating process as set forth in claim 1 which includes,
   introducing an electrolyte solution into an intermediate compartment of said electrodialytic cell, said intermediate compartment separated from said depletion compartment by an anionic membrane.

3. A process for recovering tin salts from the waste rinse water of a halogen tin plating process as set forth in claim 1 in which,
   said electrolyte solution in said anode compartment contains a sulphuric acid solution.

4. A process for recovering tin salts from the waste rinse water of a halogen tin plating process as set forth in claim 1 in which,
   said electrolyte solution in said anode compartment contains a hydrofluoric acid solution.

5. A process for recovering tin salts from the waste rinse water of a halogen tin plating process as set forth in claim 1 in which,
   said electrolyte solution in said cathode compartment contains a caustic solution.

6. A process for recovering tin salts from the waste rinse water of a halogen tin plating process as set forth in claim 5 in which,
   said caustic solution is a sodium hydroxide solution.

7. A process for recovering tin salts from the waste rinse water of a halogen tin plating process as set forth in claim 2 in which,
   said electrolyte solution in said intermediate compartment contains hydrofluoric acid.

8. A process for recovering tin salts from the waste rinse water of a halogen tin plating process as set forth in claim 2 in which,
   said electrolyte solution in said intermediate compartment contains hydrofluoric acid and said electrolyte solution in said anode compartment contains a sulphuric acid solution, said intermediate compartment separated from said anode compartment by a cationic membrane.

9. A process for recovering tin salts from the waste rinse water of a halogen tin plating process as set forth in claim 2 in which,
   said electrolyte solution in said intermediate compartment contains a hydrofluoric acid solution.

10. A process for recovering tin salts from waste rinse water as set forth in claim 1 which includes,
    filtering the rinse water and removing insoluble materials therefrom.

11. A process for recovering tin salts from waste rinse water as set forth in claim 1 which includes,
    treating the rinse water and removing organic materials therefrom.

12. A process for recovering tin salts from waste rinse water as set forth in claim 1 which includes,
   subjecting the rinse water solution with a reduced mole ratio of fluoride to tin to reverse osmosis and removing a substantial portion of the water therefrom to form a concentrated solution having the reduced mole ratio of fluoride to tin.

13. A process for recovering tin salts from waste rinse water as set forth in claim 1 which includes,
   introducing the concentrated solution into the plating bath of a halogen tin plating process.

14. A process for recovering tin salts from waste rinse water as set forth in claim 1 which includes,
   recycling the water removed from the rinse water solution to the recovery section of a halogen tin plating process.

15. A process for recovering tin salts from waste rinse water as set forth in claim 1 in which,
   said waste rinse water contains fluoride and tin in a mole ratio of between 25 and 21:1 and said rinse water withdrawn from said electrodialytic cell contains fluoride and tin in a mole ratio below about 8:1.

16. A process for recovering tin salts from waste rinse water as set forth in claim 9 which includes,
   withdrawing a portion of the hydrofluoric acid solution from said intermediate compartment,
   withdrawing a portion of the sodium hydroxide solution from the cathode compartment,
   reacting said withdrawn sodium hydroxide solution and hydrofluoric acid solutions to form a sodium bifluoride.

17. A process for reducing the mole ratio of a halogen to tin in a solution containing a halogen and tin comprising,
   introducing the solution into an electrodialytic cell,
   passing a current through the electrodialytic cell and reducing the mole ratio of halogen to tin in the solution.

* * * * *